UNITED STATES PATENT OFFICE 2,411,767

INFRARED TREATMENT OF OILS

William A. Waldie and Harry A. Toulmin, Jr., Dayton, Ohio, assignors to New Wrinkle, Inc., Wilmington, Del., a corporation of Delaware No Drawing. Application January 15, 1942, Serial No. 426,898

2 Claims. (Cl. 204—161)

This invention relates to treatment of oils, more particularly wrinkling oils, by infrared radiation, whereby the viscosity of the oil is materially increased over a shorter period of time as compared with hitherto known methods for bodying oils.

Tung oil and oiticica oil are natural wrinkling oils; that is to say, they possess the characteristic of yielding a wrinkled or uneven surface when they are incorporated in coating compositions and the latter are applied on a surface and baked.

These oils, while usable in their natural state, are generally subjected to processing prior to being incorporated in a coating composition. The purpose of this processing or pretreatment is to enhance or bring out their desirable wrinkling tendency for the purpose of obtaining a more uniform and better defined textural pattern, or in order to reduce the time required for cooking the varnish of which they form a part and thus increasing the output of the varnish kettles.

This pretreatment leads to a marked increase in viscosity of the oil, and may be accomplished either by heating alone or by heating and simultaneously blowing with air. The former method is called "kettling" or "heat bodying" and the latter is generally known as "blowing."

Blown tung oil, for example, possesses an enhanced wrinkling effect as compared with unblown or raw tung oil. Blowing, however, produces certain undesirable effects. Blown oils exhibit a tendency to gel, and coating compositions prepared with them frequently precipitate out of solution. This appears to be due to the fact that a portion of the air bubbled through the oil body remains chemically uncombined and intermolecularly dispersed, leading to auto-oxidation of the oil in storage and ultimately to precipitation of a portion thereof.

Heat bodied oils, on the other hand, do not possess the increased wrinkling tendency which is evident in the case of blown oils; however, their use proves advantageous to the varnish maker since they make possible a marked reduction in cooking time and thereby permit increasing the output of the varnish kettles.

According to our invention, we are able to increase the viscosity or body of wrinkling oils by treatment with infrared radiation, and the time required to produce an oil having any predetermined desirable viscosity or body, according to our process, is reduced as compared with hitherto known methods. At the same time, our invention makes it possible to produce wrinkling oils having all the desirable characteristics of heat bodied oils without the undesirable characteristics of blown oils.

Without thereby intending to limit our invention, the following are given as typical examples of the application of the method of our invention to the bodying of wrinkling oils:

EXAMPLE I

Tung oil was submitted to infrared radiation with agitation for a period of time totaling nine hours. Another sample of the same oil was submitted to heat bodying and agitation for a period of nine hours. In each case samples were withdrawn at intervals of time and viscosity determinations made thereon. At the same time samples were withdrawn for viscosity determinations the temperature of the oil under treatment was determined. The results are tabulated in Table I.

Table I

| Time, hours | Infrared and agitation | | Heat and agitation | |
|---|---|---|---|---|
| | Temp., °F. | Visc. secs.[1] | Temp., °F. | Visc. secs.[1] |
| 0.0 | 82 | 4.4 | 80 | 5.2 |
| 1.0 | 153 | 5.8 | 154 | 5.8 |
| 2.0 | 163 | 6.0 | 166 | 6.4 |
| 3.0 | 163 | 8.8 | 164 | 7.0 |
| 4.0 | | | 166 | 8.0 |
| 4.5 | 164 | 17.8 | | |
| 5.0 | | | 168 | 9.4 |
| 5.5 | 168 | 41.4 | | |
| 6.0 | | | 171 | 11.6 |
| 6.5 | 169 | (2) | | |
| 7.0 | | | 170 | 15.0 |
| 8.0 | | | 180 | 24.0 |
| 9.0 | | | 184 | 56.0 |

[1] At room temperature.
[2] Would not flow after tube had been inverted 4 hours.

It will be noted that the temperature of treatment was substantially the same in both tests and that the sample treated with infrared and agitation had a viscosity of 41.4 seconds at the end of five and one-half hours, as compared with a viscosity of 24.0 seconds at the end of eight hours and 56.0 seconds at the end of nine hours for the sample treated with heat and agitation. It will be further noted that the sample treated with infrared and agitation had a viscosity of 17.8 seconds at the end of four and one-half hours, while the sample treated with heat and agitation had a viscosity of 15.0 seconds after seven hours. In other words, the sample treated according to the method of our invention bodied approximately twice as fast as that submitted to heat bodying and agitation.

Example II

A sample of crude oiticica oil was treated with infrared and agitation for a period of nine hours. A second sample of the same oil was treated with heat and agitation for the same length of time. The results obtained are tabulated in Table II.

*Table II*

| Time, hours | Infrared and agitation | | Heat and agitation | |
|---|---|---|---|---|
| | Temp., ° F. | Visc. secs.[1] | Temp., ° F. | Visc. secs.[1] |
| 0 | 72 | Solid | 80 | Solid |
| 1 | 174 | 11.4 | 174 | 6.0 |
| 2 | 220 | 13.0 | 221 | 7.4 |
| 3 | 234 | 18.2 | 231 | 10.0 |
| 4 | 229 | 24.6 | 232 | 11.0 |
| 5 | 220 | 36.0 | 228 | 14.0 |
| 6 | 220 | 50.0 | 230 | 17.0 |
| 7 | 234 | 133.0 | 232 | 18.0 |
| 8 | 238 | 196.0 | 231 | 20.0 |
| 9 | 242 | 435.0 | 242 | 26.0 |

[1] At room temperature.

It will be noted that the sample treated with infrared and agitation had a viscosity of 24.6 seconds at the end of four hours, while the sample treated with heat and agitation had a viscosity of 26.0 seconds at the end of nine hours. Furthermore, it will be noted that the sample treated with infrared and agitation had a viscosity of 18.2 seconds at the end of three hours, while the sample treated with heat and agitation had a viscosity of 18.0 seconds at the end of seven hours. In other words, here, again, the time required to obtain a given viscosity was reduced approximately one-half by using the method of our invention.

In carrying out the tests tabulated in Tables I and II, a definite quantity of oil was placed in a metal container. In the case of the samples treated according to the method of our invention, a General Electric reflector type infrared R-4, 250 watt lamp was placed bearing vertical about six inches above the surface of the oil, and the sample was agitated at a uniform speed using an electrically driven stirring machine. In the case of the heat bodied samples, the same procedure was used except for the fact that the sample was heated on a hot plate instead of by the use of infrared radiation.

The viscosity was measured by filling a Gardner-Holdt tube 10.60 mm. inside diameter and approximately 110 mm. in length. The time in seconds required for the bubble to travel the length of the tube was determined by stop watch, and the reading in seconds is indicated as viscosity in Tables I and II.

It will be noted from the foregoing that it is possible, according to the method of our invention, to make a substantial reduction in the time required to give an oil a predetermined increase in viscosity and that it is, therefore, possible by the practice of the method of our invention substantially to increase the output of bodied oil from any given installation.

Wrinkling oils treated according to our invention may be used in formulating wrinkling varnishes and other coating compositions adapted to yield uniform, well textured, wrinkled surfaces when sprayed or otherwise applied and baked; such coating compositions, including wrinkling oils treated according to the method of our invention, have a tendency to give a rapid initial "set" and yield a better defined and more uniform wrinkle pattern than the same formulations when compounded with wrinkling oils bodied according to other methods.

In other words, while we have no proof to offer, it is believed that the method of our invention brings about or induces changes in the molecular structure of the oil under treatment, and that these changes lead to superior ultimate results when such oils are used in wrinkling coating compositions of various sorts.

While we have set forth above results obtained by subjecting tung oil and oiticica oil to infrared radiation with agitation, it is to be understood that similar results may be obtained by subjecting these oils to infrared radiation without agitation, so long as means are provided whereby the oil is exposed to the infrared radiation. This may be accomplished, for example, by cascading the oil to be treated through a suitable irradiating apparatus. This application, however, is not concerned with apparatus wherein the method of our invention may be carried out and is limited solely to the process and the product resulting from the practice thereof.

It will be understood that while we have described certain specific embodiments of our invention, it is not our intention to have it limited to or circumscribed by the specific details of procedure and proportions described hereinbefore, in view of the fact that our invention may be modified according to individual preference and conditions without departing from the spirit of this description and the scope of our invention as defined in the appended claims.

We claim:

1. The method of bodying a vegetable drying oil selected from the group consisting of tung oil and crude oiticica oil which consists in exposing said oil to light consisting essentially of infrared radiations of such intensity whereby the time required to obtain a given degree of body is substantially reduced.

2. The method of increasing the bodying rate of a vegetable drying oil selected from the group consisting of tung oil and crude oiticica oil which consists in exposing said oil to infrared radiation, whereby said oil is bodied substantially twice more rapidly than by heat-bodying at substantially the same temperature.

WILLIAM A. WALDIE.
HARRY A. TOULMIN, Jr.